July 22, 1924.    1,502,483

L. F. O'FLAHERTY ET AL

MIXING VALVE

Original Filed Oct. 23, 1922    2 Sheets-Sheet 1

Witnesses:

Inventors:
Leo F. O'Flaherty &
William L. Kirkpatrick

Their Attorney

Patented July 22, 1924.

1,502,483

UNITED STATES PATENT OFFICE.

LEO F. O'FLAHERTY AND WILLIAM L. KIRKPATRICK, OF ELGIN, ILLINOIS.

MIXING VALVE.

Original application filed October 23, 1922, Serial No. 596,219. Divided and this application filed November 5, 1923. Serial No. 672,726.

*To all whom it may concern:*

Be it known that we, LEO F. O'FLAHERTY and WILLIAM L. KIRKPATRICK, citizens of the United States, and residents of the city of Elgin, county of Kane, and State of Illinois, have invented certain new and useful Improvements in Mixing Valves, of which the following is a specification.

Our invention relates to new and useful improvements in mixing valves, especially such as are used on bath tubs, basins, sinks, etc., and has for its object to provide a particularly durable and inexpensive mixing valve constructed from a minimum of parts and which will mix hot and cold water to any degree of temperature to suit the user.

Another object is to provide a strong and compact valve by making its inlet control means, its discharge control means, and its operating threads all integral with the valve stem.

Other objects will appear hereinafter.

This is a division of applicant's prior case for mixing valves Serial No. 596,219, filed October 23, 1922.

The invention consists in the combinations and arrangements of parts hereinafter described and claimed.

The invention will be best understood by reference to the accompanying drawings, forming a part of this specification, and in which, Fig. 1 is a plan view of our invention with the valve closed;

Figure 1:
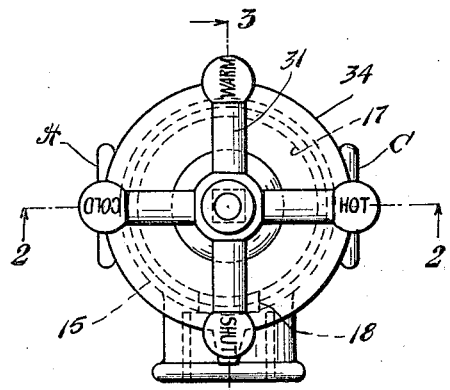
Figure 4:
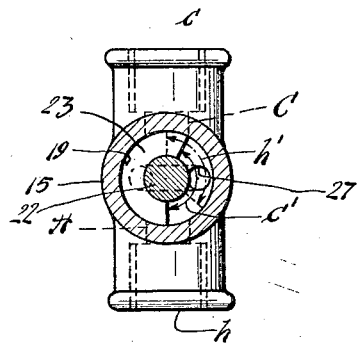
Fig. 4 is a horizontal section on line 4—4 of Fig. 3, showing the valve closed.
Figure 2:
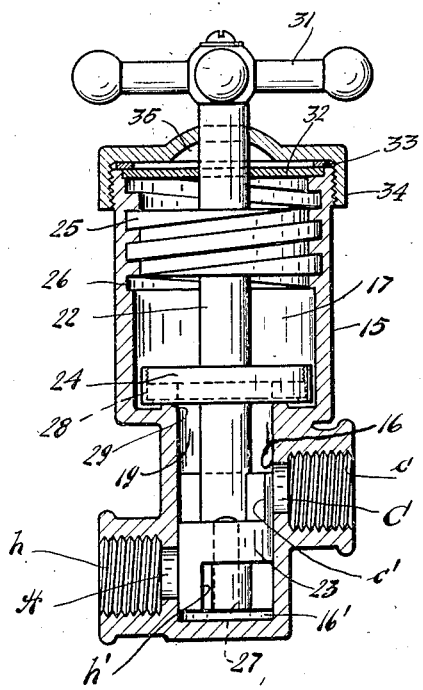
Fig. 2 is a vertical section through the closed valve, taken on line 2—2 of Fig. 1.
Figure 5:
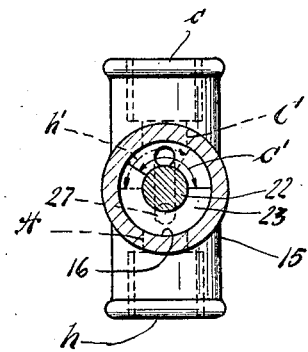
Figure 6:
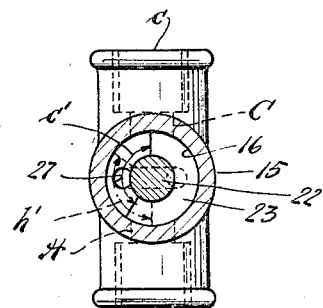
Figure 8:
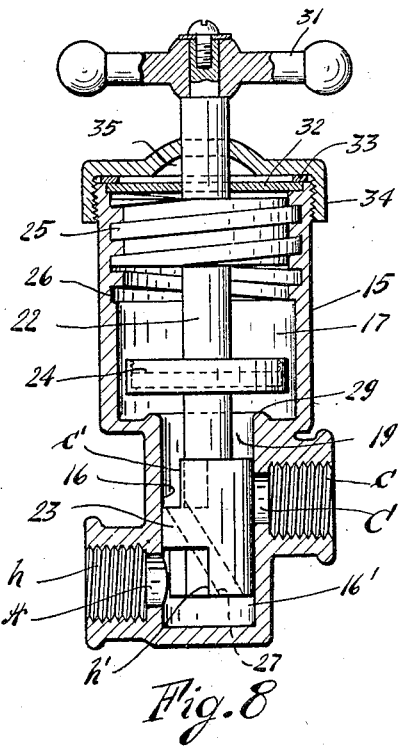
Figure 7:
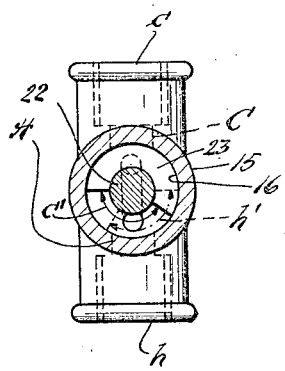

Figs. 5, 6, and 7, are horizontal sections, similar to Fig. 4, but each showing the valve turned anti-clockwise through an additional angle of 90°, Fig. 5 showing the cold water port full open and the hot water port closed, Fig. 6 showing both ports half open, and Fig. 7 showing the hot water port full open and the cold water port closed; and Fig. 8 is a vertical section similar to Fig. 2, but showing the valve at its uppermost position with the hot water port full open and the cold water port closed.

The particular form of our invention illustrated in this application comprises a casing 15 having a contracted receiving chamber 16 in its lower portion and which opens upwards into a discharge chamber 17 provided with a suitable discharge opening or port 18. The receiving chamber is provided with a hot water inlet (H) at its lower end leading from the threaded extension (*h*) to a lower receiving portion or space 16' of the receiving chamber 16, and with a cold water inlet (C) leading from the threaded extension (*c*) into the upper end of said chamber 16, this upper end of said chamber 16 constituting a mixing chamber 19.

In order to simplify the valve construction and make it durable, the main movable members are made in one casting, thus the stem 22 is formed integral with the inlet control means or core 23, with the discharge control means or sealing valve 24, and with the operating threads 25, said threads engaging in threaded grooves 26 provided in the upper portion of the casing.

The core 23 is constructed with a solid interior and is provided with an upper peripheral notch or pocket (*c'*), substantially segmental in form, which is registerable with the cold water inlet (C) and opens directly into the mixing chamber 19; said core is further provided with a similar lower peripheral notch or pocket (*h'*) which is registerable with the hot water inlet (H) and opens directly into the receiving portion or space 16'. Said core is also provided with a slanting bore 27 therethrough which connects the receiving portion 16' with the pocket (*c'*), and thereby connects the pocket (*h'*) as well as the receiving portion 16' with the mixing chamber 19 through said pocket (*c'*).

Figure 3:
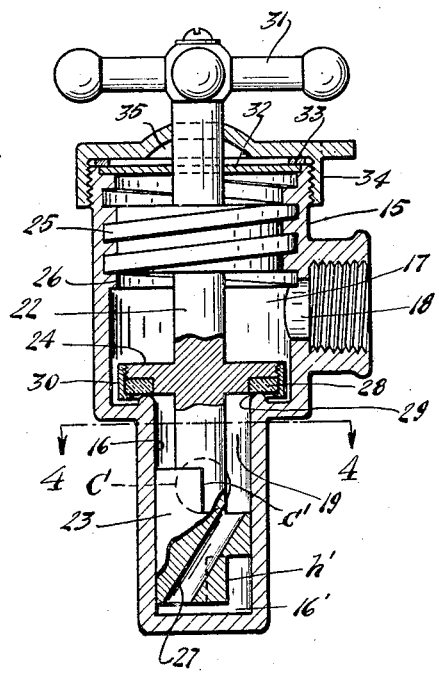
Fig. 3 is a vertical section taken at right angles to Fig. 2, on line 3—3 of Fig. 1.

The sealing valve 24 is provided with a compression gasket 28 as best shown in Fig. 3, to engage an annular rib 29 formed at the upper end of the mixing chamber 19, and a collar 30 retains said gasket in position on the valve.

A handle 31 is detachably mounted on the stem 22 for rotating said stem, as best shown in Fig. 8, or in any other approved manner, and the top of the casing is sealed by means of a disc 32, gasket 33 and cap 34, a space 35 being provided in the cap to receive the suitable packing.

It is apparent from the above description and the drawings that the valve casing of this mixing valve consists of one integral member and that the main operating means of the movable valve mechanism also consists of one integral member, in other words that the main valve elements of this device consist of only two distinct castings; and it is furthermore apparent that this valve can be readily adjusted or set in order to mix the hot and cold water to any desired degree of temperature, and that when the valve is closed, the mixing chamber will be sealed by means of the sealing valve 24 firmly engaging the annular rib 29, thereby positively preventing any leakage of the valve to the discharge chamber and the outlet.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent, is:

1. A mixing valve comprising a casing having a plurality of inlets and an outlet, a valve stem with a solid integral core, peripheral pockets on said core registerable with said inlets, and a small bore through said core providing communication between said pockets.

2. A mixing valve comprising a casing provided with inlets and an outlet, a valve core provided with a pocket for each inlet, a mixing chamber in said casing in open communication with one of said pockets, a space in said casing in open communication with the other of said pockets, and a diagonal bore extending through said core from its bottom to the pocket which communicates with the mixing chamber.

3. A mixing valve comprising a casing proided with inlets and an outlet, a valve core provided with a pocket for each inlet, a mixing chamber in open communication with one of said pockets, a lower chamber portion in open communication with the other of said pockets, a bore through said core providing communication between said pockets, and a sealing valve constructed integral with said core for closing communication between said mixing chamber and the outlet.

4. A mixing valve comprising a casing having inlets and an outlet, a mixing chamber conected to one of said inlets and to said outlet, a valve stem having an integral valve member for closing connections between said mixing chamber and outlet, a solid core provided with a peripheral notch connecting one inlet with said mixing chamber, a peripheral notch on said core registerable with the other inlet, and a bore extending diagonally through said core to provide communication from the second notch and inlet to the mixing chamber.

5. A mixing valve comprising a casing having inlets and an outlet, a mixing chamber registerable with one of said inlets and the outlet, a valve stem having an integral valve member for closing communication between said mixing chamber and outlet, a solid core integral with said stem and provided with a segmental pocket for connecting one inlet with said mixing chamber, a diagonal bore through said core connecting said pocket with a space in the lower part of said casing, and a segmental pocket at the lower part of said core for connecting another inlet with said space.

6. A mixing valve comprising a casing having inlets and an outlet, a mixing chamber registerable with one of said inlets and the outlet, a valve stem having an integral valve member for closing communication between said mixing chamber and outlet, a solid core integral with said stem and provided with a segmental pocket for connecting one inlet with said mixing chamber, a diagonal bore through said core connecting said pocket with a space in the lower part of said casing, a segmental pocket at the lower part of said core for connecting another inlet with said space, and threaded means integral with said stem for adjusting said valve to provide the desired mixing of the fluids from said inlets.

7. A mixing valve comprising a casing having its inlet portion, mixing portion, discharge portion, and operating threads constructed in one casting; said valve having all of its movable mechanism formed integral and including a stem, operating threads thereon, a solid valve core with separated peripheral pockets, and a bore through said core operatively connecting said pockets.

In testimony whereof we have signed our names to this specification in the presence of two subscribing witnesses.

LEO F. O'FLAHERTY.
WILLIAM L. KIRKPATRICK.

Witnesses:
GUSTAV F. VODICKA,
FRANK M. O'FLAHERTY.